United States Patent
Kovac et al.

(10) Patent No.: US 8,277,153 B2
(45) Date of Patent: Oct. 2, 2012

(54) CUTTING INSERT AND SHIM FOR HEAVY MACHINING OPERATIONS

(75) Inventors: Jeffrey Francis Kovac, Loyalhanna, PA (US); Kumar Reddy Mylavaram Nikhilesh, Monroeville, PA (US)

(73) Assignee: Kennametal Inc., Latrobe, PA (US)

( * ) Notice: Subject to any disclaimer, the term of this patent is extended or adjusted under 35 U.S.C. 154(b) by 510 days.

(21) Appl. No.: 12/629,535

(22) Filed: Dec. 2, 2009

(65) Prior Publication Data

US 2011/0129309 A1    Jun. 2, 2011

(51) Int. Cl.
*B23B 27/16* (2006.01)
(52) U.S. Cl. ................................ 407/113; 407/103
(58) Field of Classification Search .......... 407/113–115, 407/102–104
See application file for complete search history.

(56) References Cited

U.S. PATENT DOCUMENTS

| | | |
|---|---|---|
| 4,202,650 A | 5/1980 | Erickson |
| 4,575,287 A | 3/1986 | Oshnock et al. |
| 5,292,213 A | 3/1994 | Massa et al. |
| 5,810,518 A * | 9/1998 | Wiman et al. ............. 407/102 |
| 6,872,034 B2 | 3/2005 | Satran et al. |
| 7,014,396 B2 | 3/2006 | Satran et al. |
| 7,063,489 B2 | 6/2006 | Satran |
| 7,073,987 B2 * | 7/2006 | Hecht .......................... 407/113 |
| 7,104,736 B2 | 9/2006 | Satran et al. |
| 7,381,015 B2 * | 6/2008 | Jonsson ....................... 407/116 |
| 2003/0170080 A1 | 9/2003 | Hecht |
| 2006/0210365 A1* | 9/2006 | Hecht .......................... 407/103 |
| 2012/0121345 A1* | 5/2012 | Neiman et al. .............. 407/103 |

FOREIGN PATENT DOCUMENTS

| | | |
|---|---|---|
| WO | 96-32217 A1 | 10/1996 |
| WO | 02-24387 A1 | 3/2002 |
| WO | 2004-050283 A1 | 6/2004 |

* cited by examiner

*Primary Examiner* — Boyer D. Ashley
*Assistant Examiner* — Sara Addisu
(74) *Attorney, Agent, or Firm* — Larry R. Meenan, Esq.

(57) ABSTRACT

A combination of a cutting insert and a shim. The cutting insert and shim have two opposing end surfaces with two identical opposing major side surfaces and two identical opposing minor side surfaces extending between the minor side surfaces. Each end surface of the insert has two lowered abutment members, each having a shim abutment surface for contacting the shim. One end surface of the shim has two raised abutment members, each having an insert abutment surface for contacting the insert. The abutment surfaces contact each other in an area where high cutting forces occur so as to help distribute the loads encountered in the cutting operation, as well as provide protection of the insert pocket in case of insert failure.

10 Claims, 11 Drawing Sheets

US 8,277,153 B2

CUTTING INSERT AND SHIM FOR HEAVY MACHINING OPERATIONS

FIELD OF THE INVENTION

In general, the invention relates to a cutting insert and a cutting tool, and in particular to a combination of a cutting insert and shim for a milling cutter that contact with each other in an area where high cutting forces occur so as to help distribute the loads (stresses) encountered in the cutting operation, as well as provide protection of the insert pocket in case of insert failure.

BACKGROUND OF THE INVENTION

One problem encountered with conventional tool holders is that of holding the cutting insert securely in the pocket of the tool holder. At the beginning of a cutting operation, the sudden transition from no load to extreme pressure load on the insert can cause the insert to shift position in the holder and thereby affect the accuracy of the planned cut. At the end of the cutting operation, the sudden disengagement of the cutting insert from the workpiece causes the pressure load suddenly to be removed from the insert. This sudden change in load can cause the insert to shift and distress any repeatable dimensional accuracy, which is essential for most tool holders, especially cutting inserts used in Numerically Controlled machines, to meet.

During the cutting operation, loads of up to 35,000 pounds may be encountered on the cutting insert which, if the insert is not precisely located and firmly held in the holder to begin with, can also cause shifting of the insert during the cutting operation. It is, therefore, important to provide a tool holder that can precisely and securely seat a cutting insert and then securely hold the cutting insert in location during all phases of the heavy duty cutting operation.

SUMMARY OF THE INVENTION

In one aspect of the invention, in combination, a cutting insert and shim for heavy machining operations. The cutting insert comprises two opposing end surfaces, two opposing minor side surfaces extending between the two opposing end surfaces, two opposing major side surfaces extending between the end surfaces and the minor side surfaces, each end surface having four corners including two lowered corners and two raised corners, each end surface provided with two raised abutment members and two lowered abutment members, each lowered abutment member having a shim abutment surface, wherein the shim abutment surfaces are diagonally opposite each other with respect to the second, central axis of the cutting insert. The shim comprises two opposing end surfaces, two opposing minor side surfaces extending between the two opposing end surfaces, two opposing major side surfaces extending between the end surfaces and the minor side surfaces, one end surface having four corners including two lowered corners and two raised corners, the one end surface being provided with two raised abutment members and two lowered abutment members, each raised abutment member having an insert abutment surface, wherein the insert abutment surfaces are diagonally opposite each other with respect to the second, central axis of the shim. The shim abutment surfaces of the cutting insert engage the insert abutment surfaces of the shim when the cutting insert and shim are mounted within an insert pocket of a cutting tool.

In another aspect, a milling cutter comprises a plurality of insert pockets, and the combination of a cutting insert and a shim seated in each of the plurality of insert pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
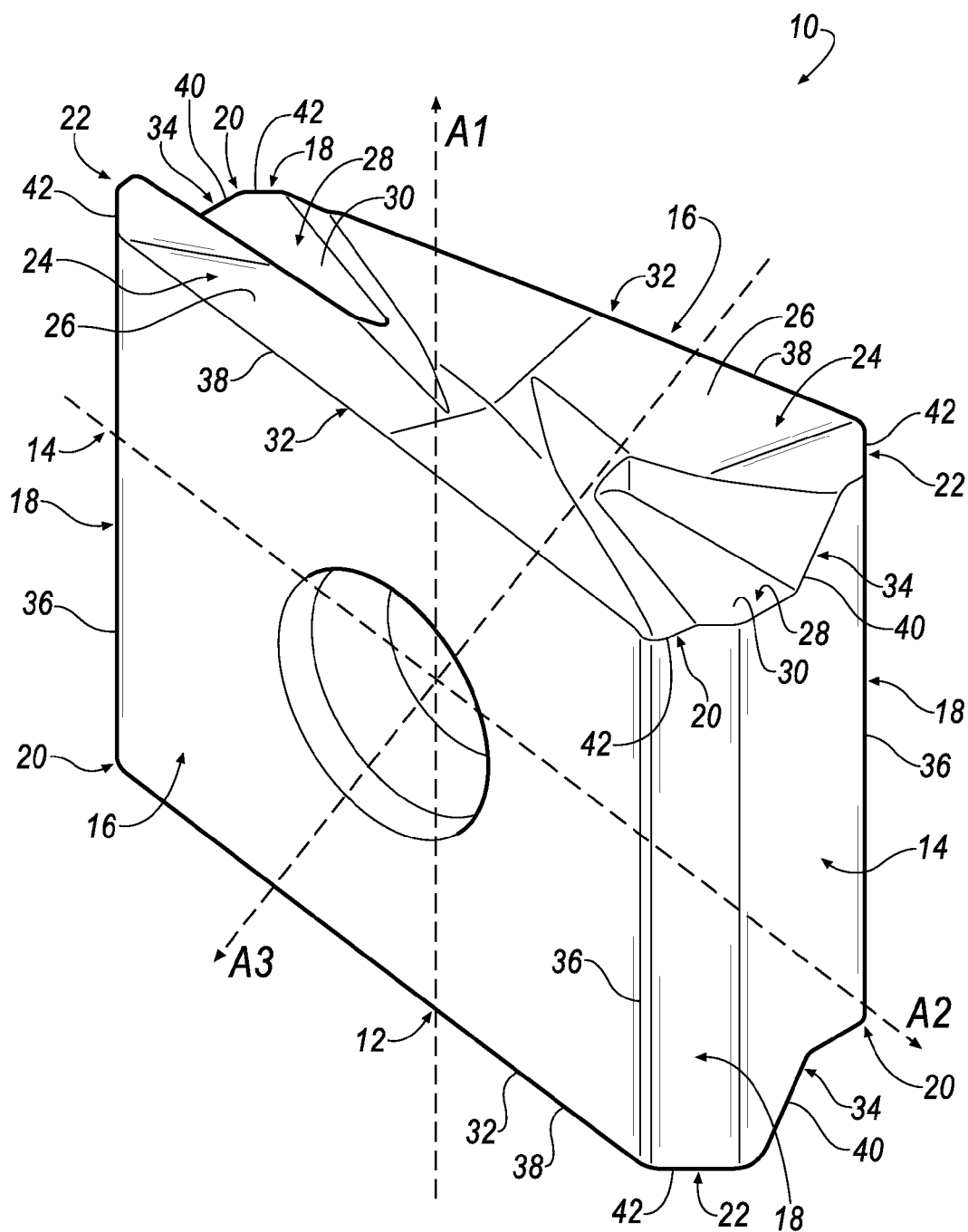
FIG. 1 is an isometric view of an exemplary embodiment of a cutting insert of the invention.

Referring now to FIGS. 1-5, a cutting insert 10 is shown according to an embodiment of the invention. In general, the cutting insert 10 is tangential and indexable. The cutting insert 10 is typically manufactured by form-pressing and sintering carbide powders using methods well-known in the art. The cutting insert 10 is generally rectangular in shape and has two identical opposing end surfaces 12, two identical opposing minor side surfaces 14 extending between the two opposing end surfaces 12, two identical opposing major side surfaces 16 extending between the end surfaces 12 and the minor side surfaces 14. Each end surface 12 has 180° rotational symmetry about a first central axis A1 passing through the two end surfaces 12, each minor side surface 14 has 180° rotational symmetry about a second central axis A2 passing through the two minor side surfaces 14, and each major side surface 16 has 180° rotational symmetry about a third central axis A3 passing through the two major side surfaces 16. The second central axis A2 is perpendicular to the first central axis A1, and the third central axis A3 is perpendicular to the first central axis A1 and to the second central axis A2. The cutting insert 10 also includes four opposed corner side surfaces 18 between the minor and major side surfaces 14, 16 and the end surfaces 12.

Figure 2:
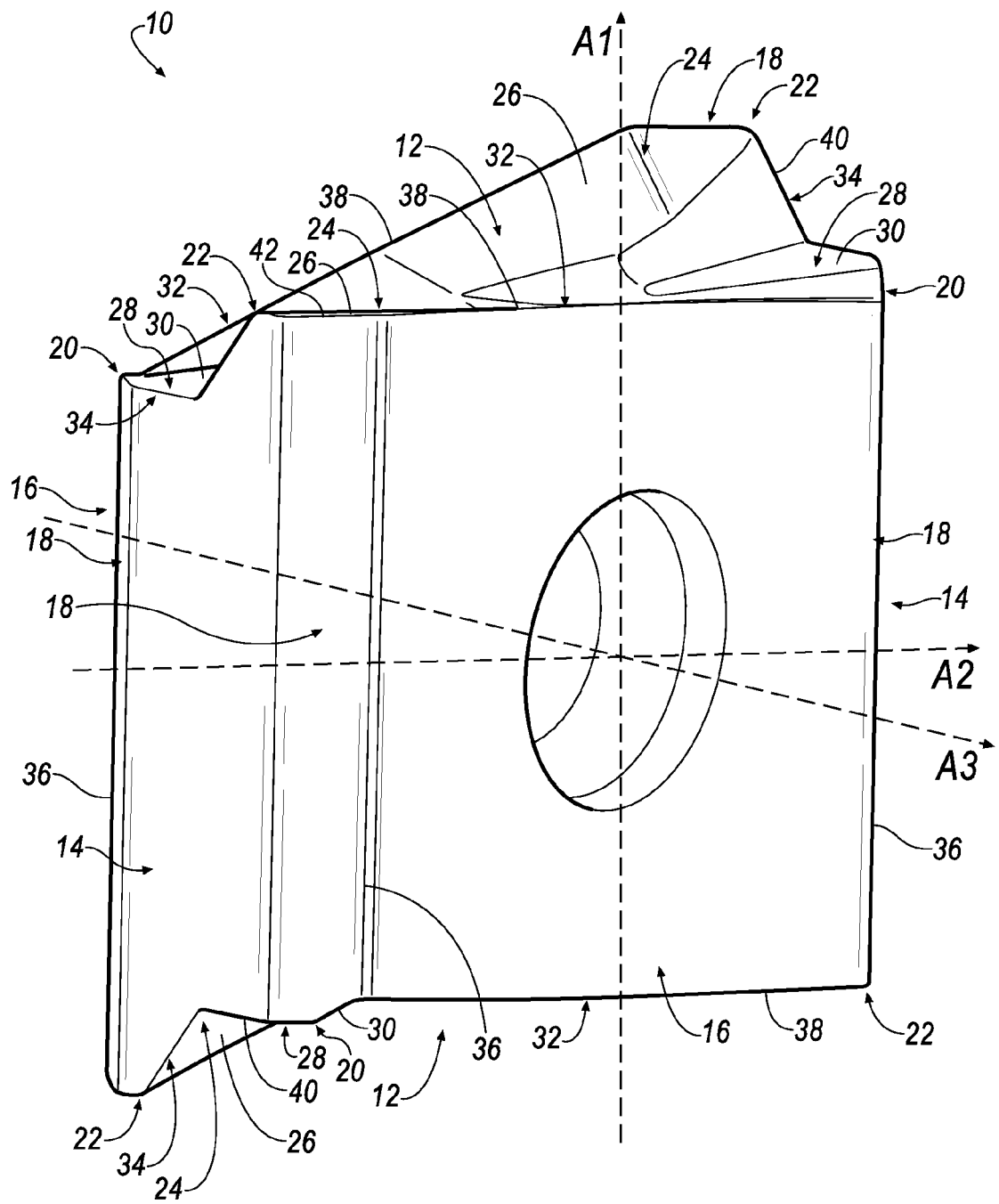
FIG. 2 is another isometric view of the exemplary embodiment of the cutting insert of FIG. 1.
Figure 3:
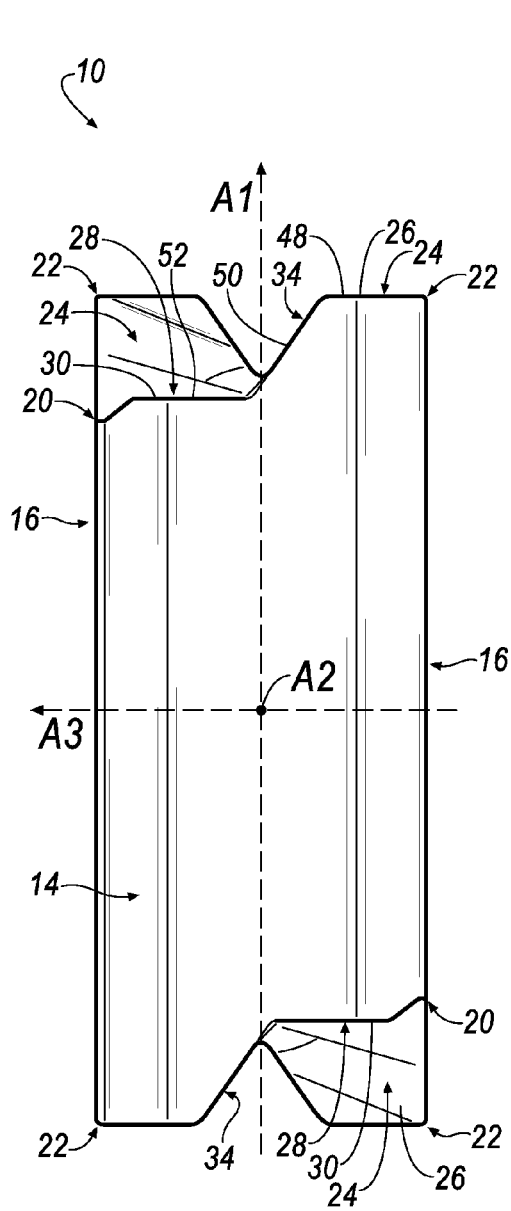
FIG. 3 is an end view of the exemplary embodiment of the cutting insert of FIG. 1.
Figure 4:
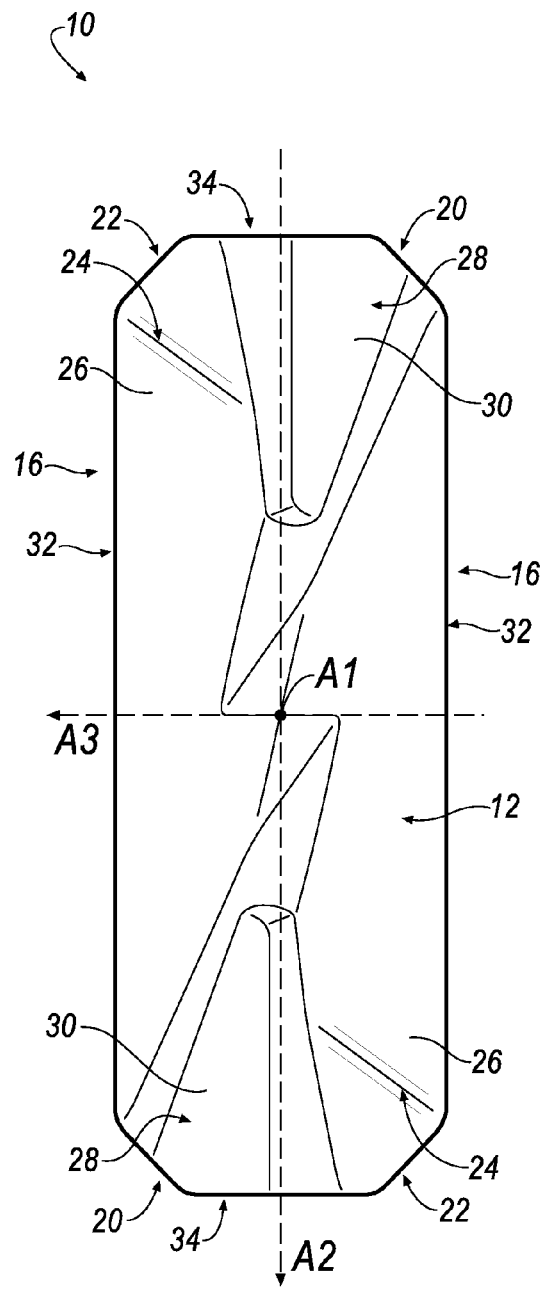
FIG. 4 is another end view of the exemplary embodiment of the cutting insert of FIG. 1.
Figure 5:
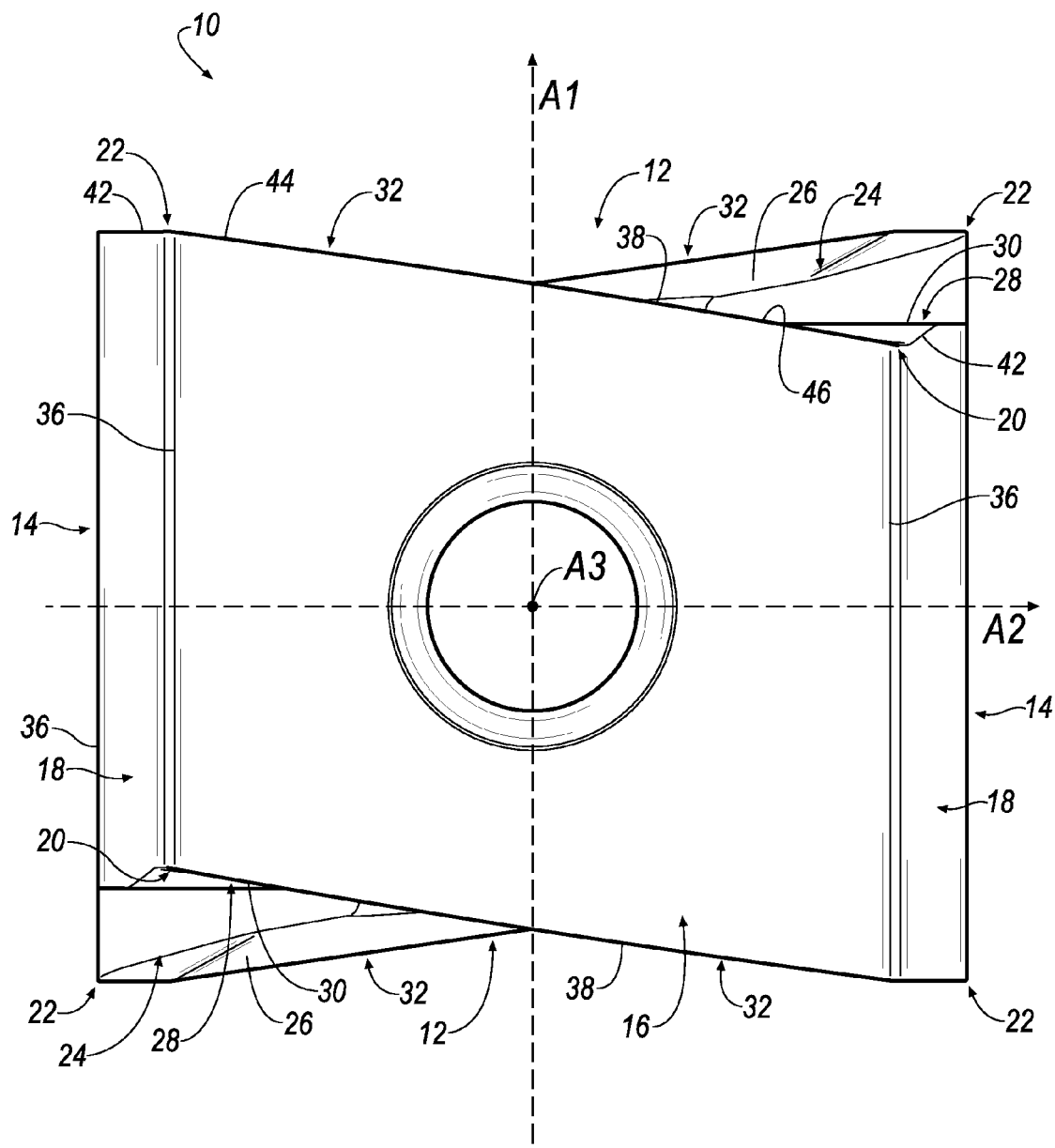
FIG. 5 is a side view of the exemplary embodiment of the cutting insert of FIG. 1.

Each end surface 12 has four corners; two diagonally opposite lowered corners 20 and two diagonally opposite raised corners 22. The lowered corners 20 are closer to the second central axis A2 than the raised corners 22. Each corner side surface 18 extends between the raised corner 22 of one of the two opposing end surfaces 12 and the lowered corner 20 of the other one of the two opposing end surfaces 12. Each end surface 12 is provided with two raised members 24, each raised member 24 having a surface 26, and two lowered abutment members 28, each lowered abutment member 28 having a shim abutment surface 30 for contacting the shim 60. The shim abutment surfaces 30 are diagonally opposite each other with respect to the second central axis A2. As seen in FIGS. 2 and 3, the shim abutment surfaces 30 are substantially coplanar with each other and are substantially parallel with both the second central axis A2 and the third central axis A3.

Two opposing major edges 32 are formed at the intersection of each end surface 12 and the major side surfaces 16, two opposing minor edges 34 are formed at the intersection of each end surface 12 and the minor side surfaces 14, and two opposing corner edges 36 are formed at the intersection of each the corner side surfaces 18 and the major side surfaces 16. A major cutting edge 38 is formed at the intersection of each major edge 32 and the end surface 12 and extends along substantially the entire length of its associated major edge 32. A minor cutting edge 40 is formed at the intersection of each minor edge 34 and the end surface and extends along at least half of the length of its associated minor edge 34. A corner cutting edge 42 is formed at the intersection of the major and minor cutting edges 38, 40. The section of the major cutting edge 38 proximate the raised corner 22 constitutes a leading end 44 of the major cutting edge 38, whereas the section of the major cutting edge 38 proximate the lowered corner 20 constitutes a trailing end 46 of the major cutting edge 38.

As seen in FIG. 3, the minor edge 34 is divided into three substantially straight sections; a first section 48 extending from the raised corner 22 to approximately one-half the distance to the central axis A1; a second section 50 extending from the first section 48 to approximately the central axis A1; and a third section 52 extending from the central axis A1 to the lowered corner 20. As seen in FIG. 3, the minor edge 34 is generally L-shaped when viewed from the side of the cutting insert 10. That is, the first section 48 and the third section 52 are substantially parallel to each other and to the third central axis A3. In other words, the first and third sections 48, 52 do not overlap and do not lie on a common straight line when viewed from the side of the cutting insert 10.

Referring now to FIGS. 6-10, a shim 60 is shown according to an embodiment of the invention. In general, the shim 60 is generally rectangular in shape and has two identical opposing end surfaces 62, two identical opposing minor side surfaces 64 extending between the two opposing end surfaces 62, two identical opposing major side surfaces 66 extending between the end surfaces 62 and the minor side surfaces 64. Each end surface 62 has 180° rotational symmetry about a first central axis A1 passing through the two end surfaces 62, each minor side surface 64 is asymmetric about a second central axis A2 passing through the two minor side surfaces 64, and each major side surface 66 has 180° rotational symmetry about a third central axis A3 passing through the two major side surfaces 66. The second central axis A2 is perpendicular to the first central axis A1, and the third central axis A3 is perpendicular to the first central axis A1 and to the second central axis A2. The cutting insert 10 also includes four opposed corner side surfaces 68 between the minor and major side surfaces 64, 66 and the end surfaces 62.

Figure 6:
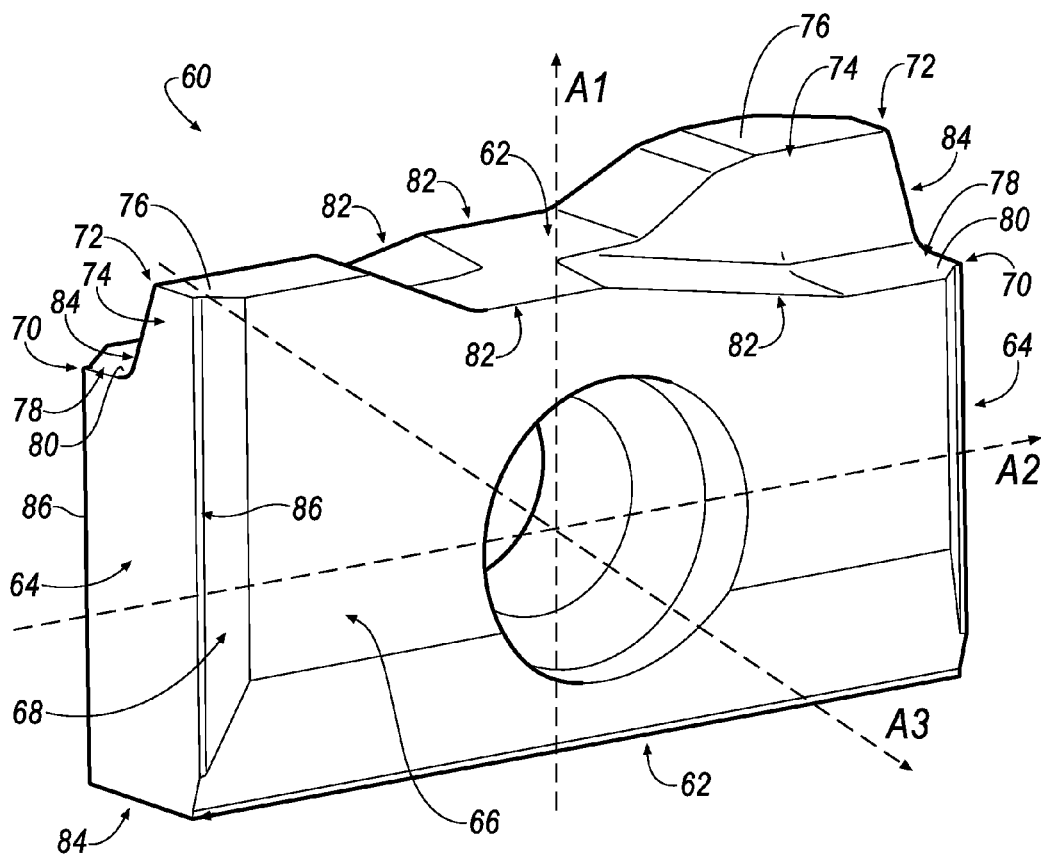
FIG. 6 is an isometric view of an exemplary embodiment of a shim of the invention.
Figure 7:
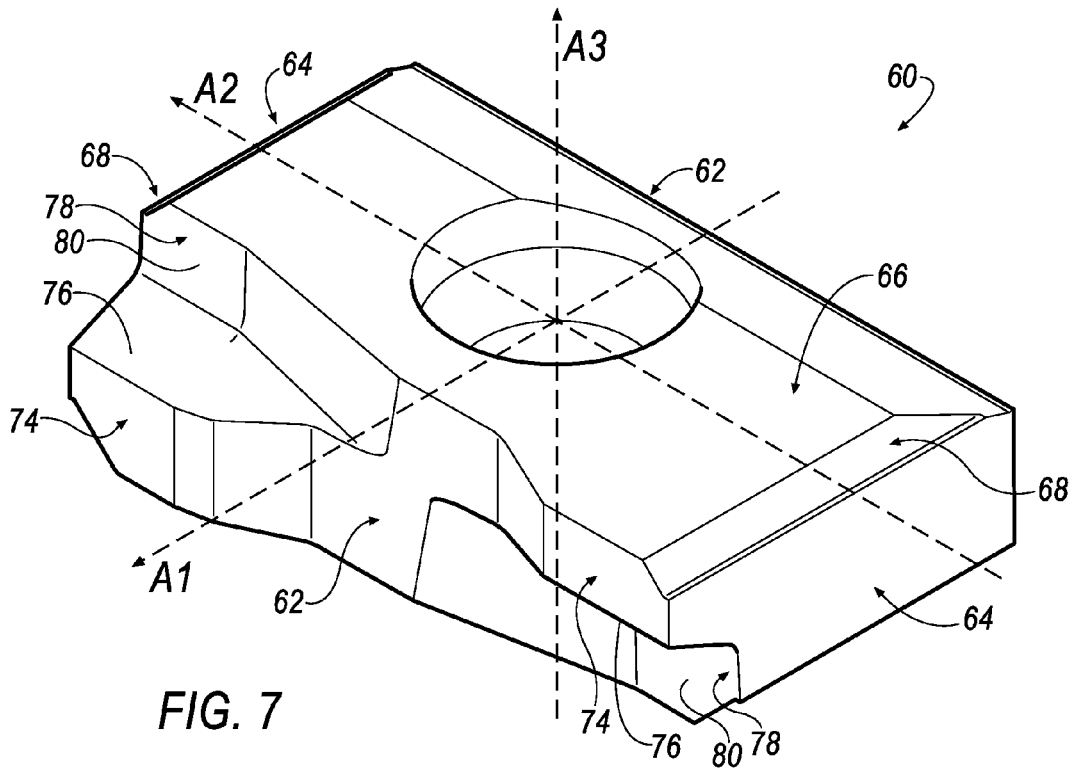
FIG. 7 is another isometric view of an exemplary embodiment of the shim of FIG. 6.
Figure 8:
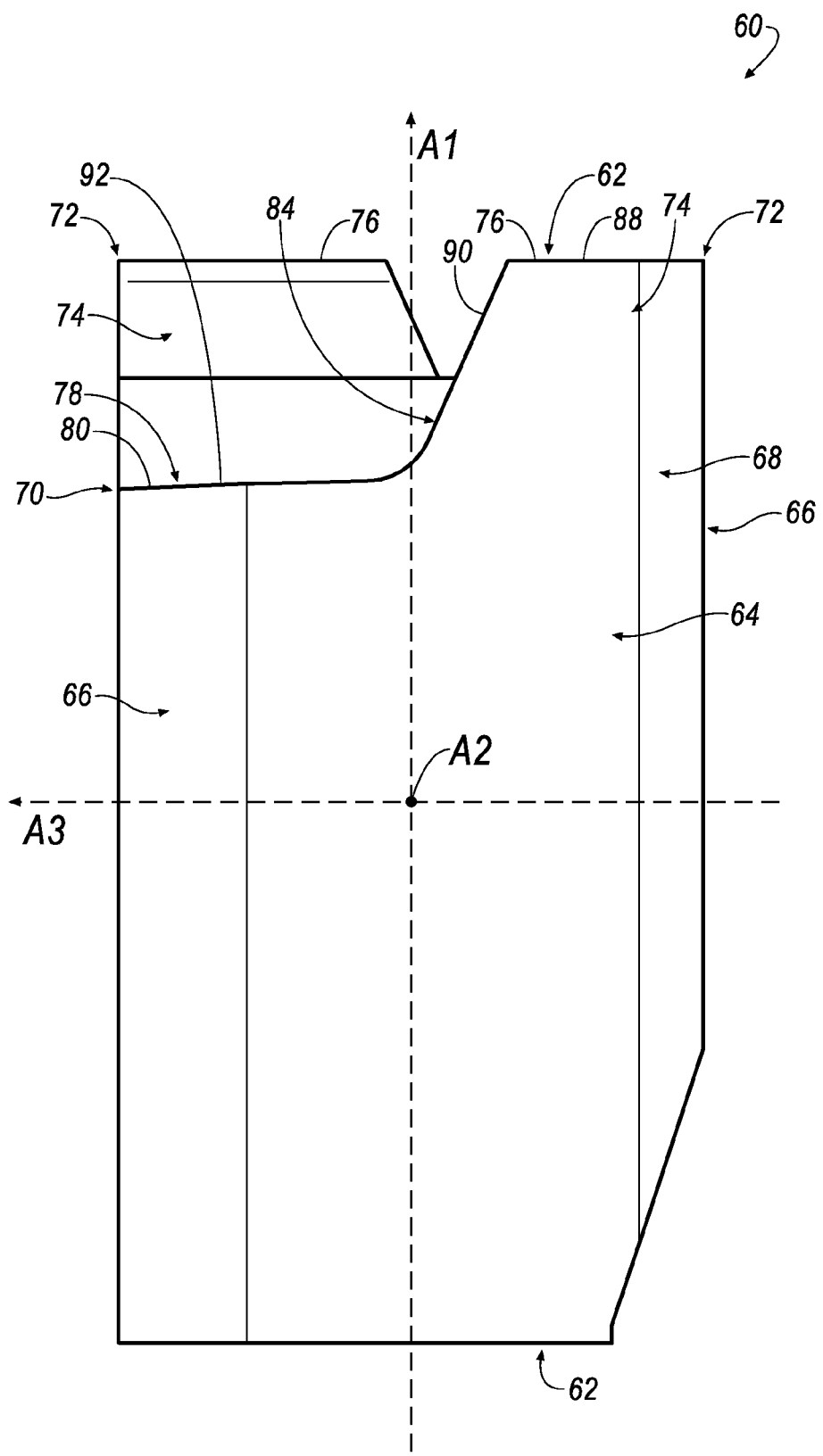
FIG. 8 is an end view of the exemplary embodiment of the shim of FIG. 6.
Figure 9:
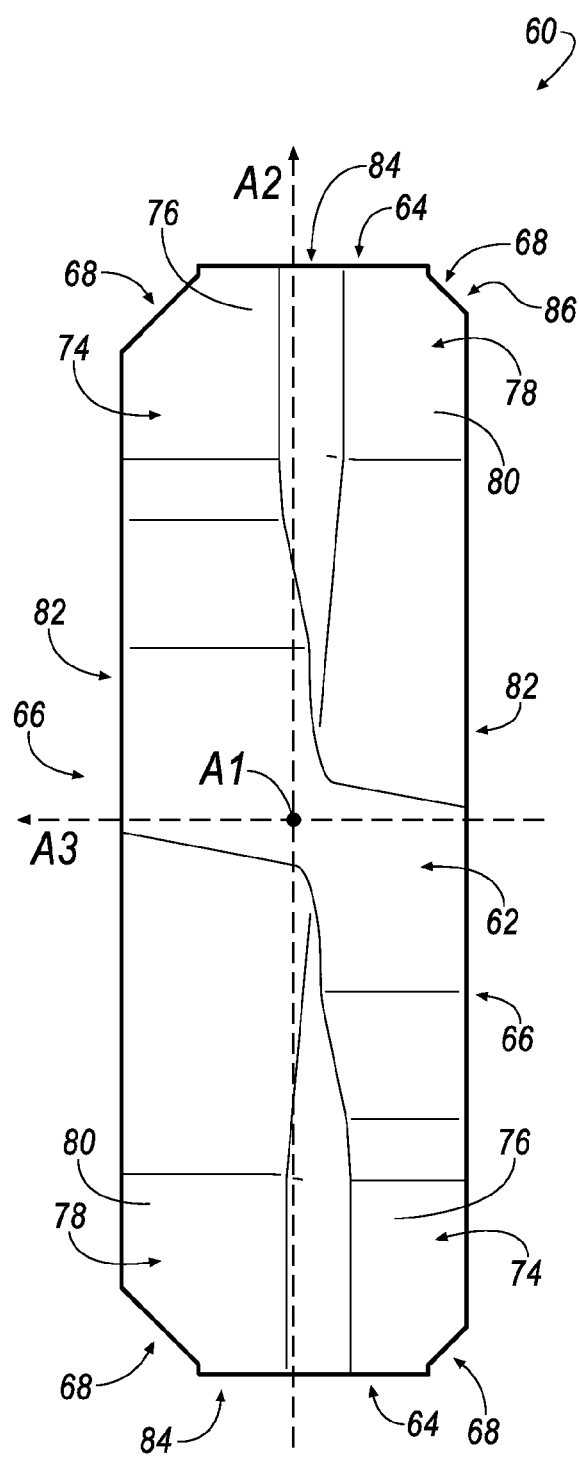
FIG. 9 is another end view of the exemplary embodiment of the shim of FIG. 6.
Figure 10:
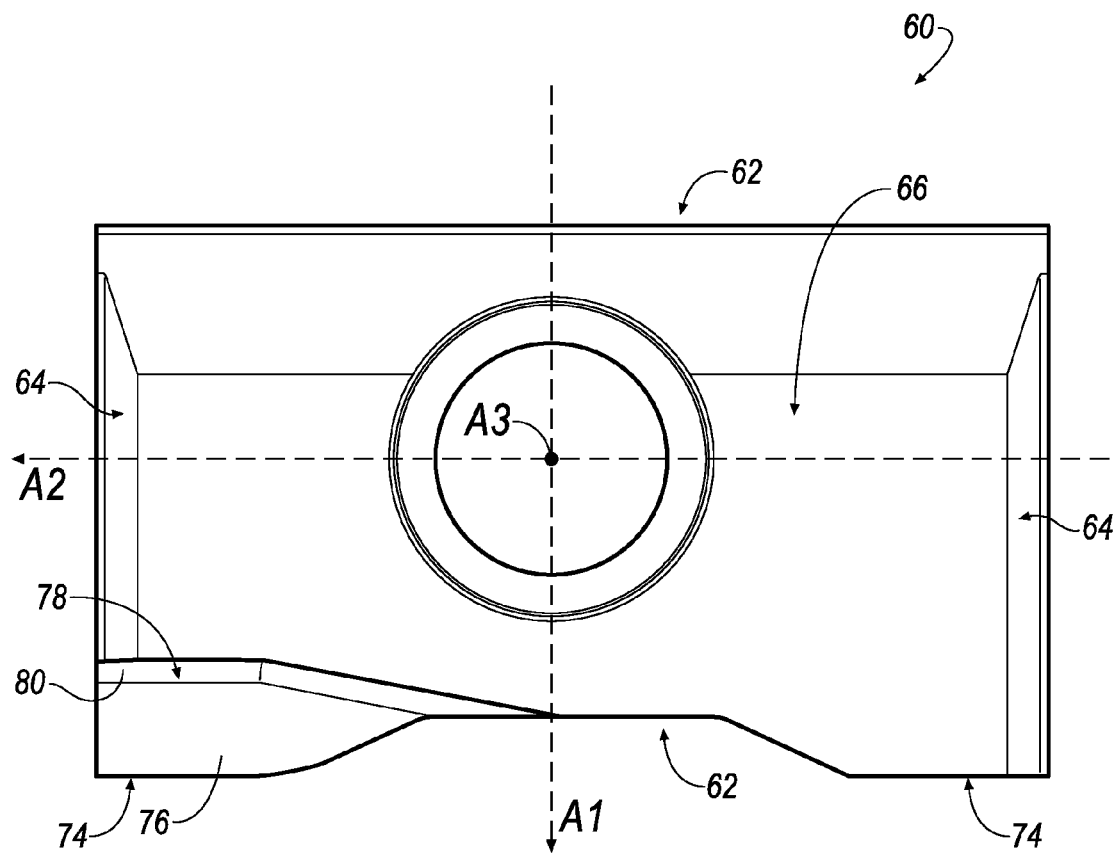
FIG. 10 is a side view of the exemplary embodiment of the shim of FIG. 6.

Similar to the cutting insert 10, one of the end surfaces 62 has four corners; two diagonally opposite lowered corners 70 and two diagonally opposite raised corners 72. Unlike the cutting insert 10, the other end surface 62 is substantially planar for engaging the rear wall of the insert pocket, as described below. The lowered corners 70 are closer to the second central axis A2 than the raised corners 72. Each corner side surface 68 extends between the raised corner 72 of one of the two opposing end surfaces 62 and the lowered corner 70 of the other one of the two opposing end surfaces 62. One of the end surfaces 62 is provided with two raised abutment members 74, each raised abutment member 74 having an insert abutment surface 76 for contacting the insert 10, and two lowered members 78, each lowered member 78 having a surface 80. The insert abutment surfaces 76 are diagonally opposite each other with respect to the second central axis A2. As seen in FIGS. 6 and 8, the insert abutment surfaces 76 are substantially coplanar with each other. In addition, the insert abutment surfaces 76 are substantially parallel with both the second central axis A2 and the third central axis A3.

Two opposing major edges 82 are formed at the intersection of each end surface 62 and the major side surfaces 66, two opposing minor edges 84 are formed at the intersection of each end surface 62 and the minor side surfaces 64, and two opposing corner edges 86 are formed at the intersection of each the corner side surfaces 68 and the major side surfaces 66.

As seen in FIG. 8, the minor edge 84 is divided into three substantially straight sections; a first section 88 extending from the raised corner 72 to approximately one-half the distance to the central axis A1; a second section 90 extending from the first section 88 to approximately the central axis A1; and a third section 92 extending from the central axis A1 to the lowered corner 70. As seen in FIG. 8, the minor edge 84 is generally L-shaped in the side view, similar to the minor edge 34 of the cutting insert 10. That is, the first section 88 and the third section 92 are substantially parallel to each other and to the third central axis A3. In other words, the first and third sections 88, 92 do not overlap and do not lie on a common straight line when viewed from the side of the shim 60.

Figure 11:
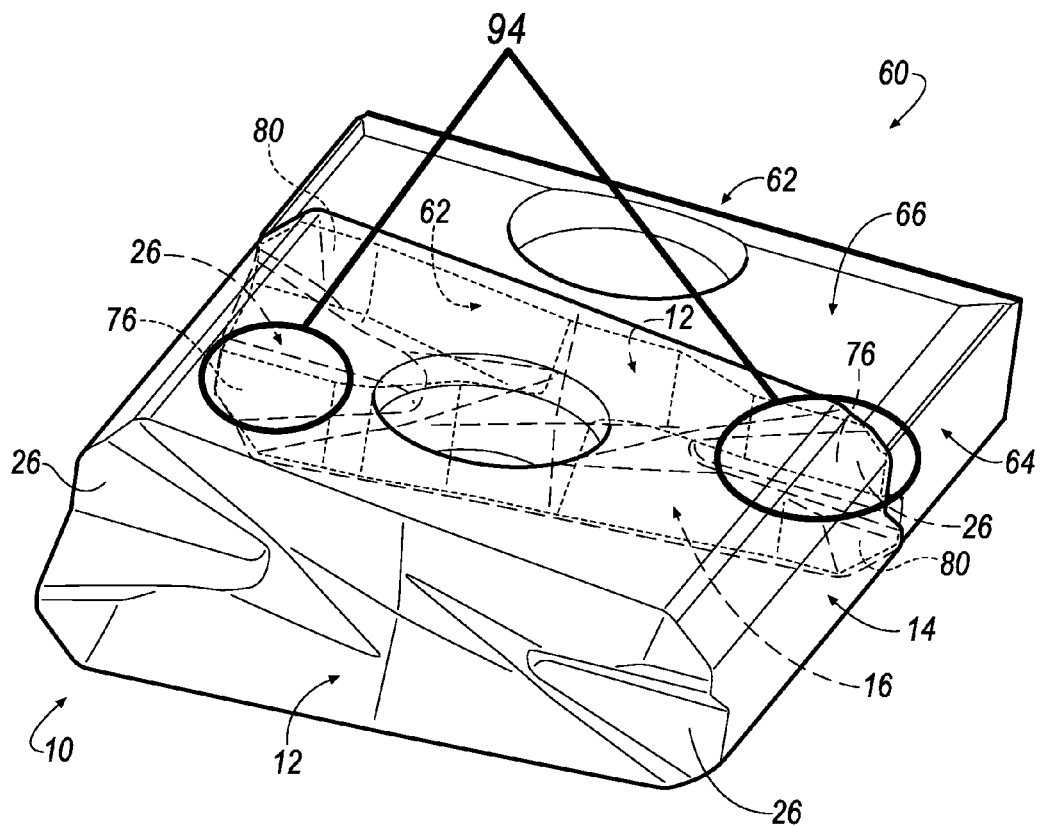
FIG. 11 is an isometric view of an exemplary embodiment of the combination cutting insert and shim.
Figure 12:
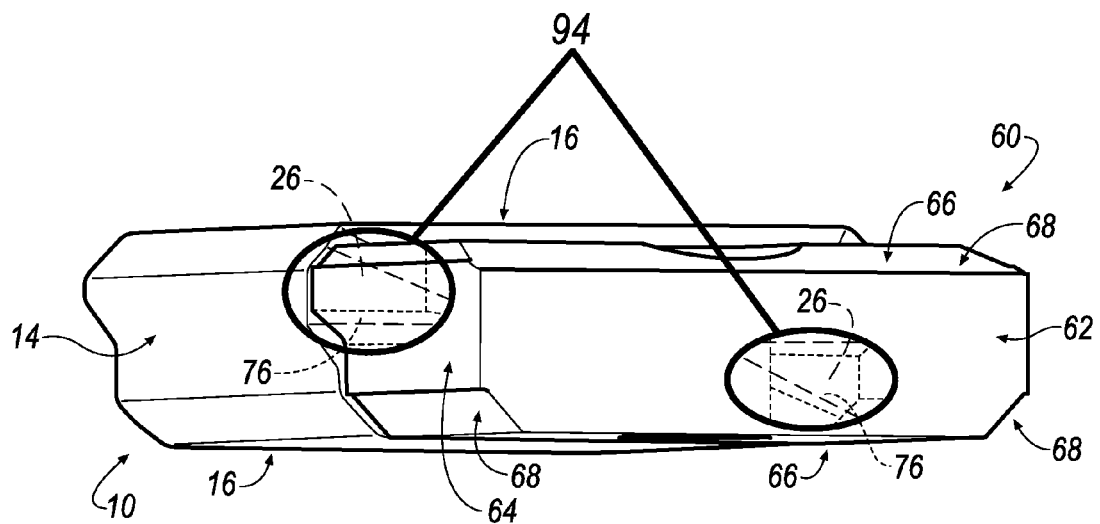
FIG. 12 is a side view of the exemplary embodiment of the combination cutting insert and shim.

Referring now to FIGS. 11 and 12, the insert 10 and the shim 60 interact with each other to provide additional support to permit proper seating and reduce rotation of the cutting insert 10 during heavy machining applications, as compared to conventional cutting inserts and shims. Specifically, the diagonally opposite shim abutment surfaces 26 on the end surface 12 of the cutting insert 10 engage the diagonally opposite insert abutment surfaces 76 of the shim 60. This diagonally opposite engagement of the cutting insert 10 and the shim 60 is located in an area 94 where high cutting forces occur during heavy machining applications. Because the cutting insert 10 and the shim 60 contact each other in the area 94 where high cutting forces (and high stress) occur, additional support to permit proper seating and reduced rotation of the cutting insert 10 is provided by the cutting insert 10 and shim 60 of the invention.

Figure 13:
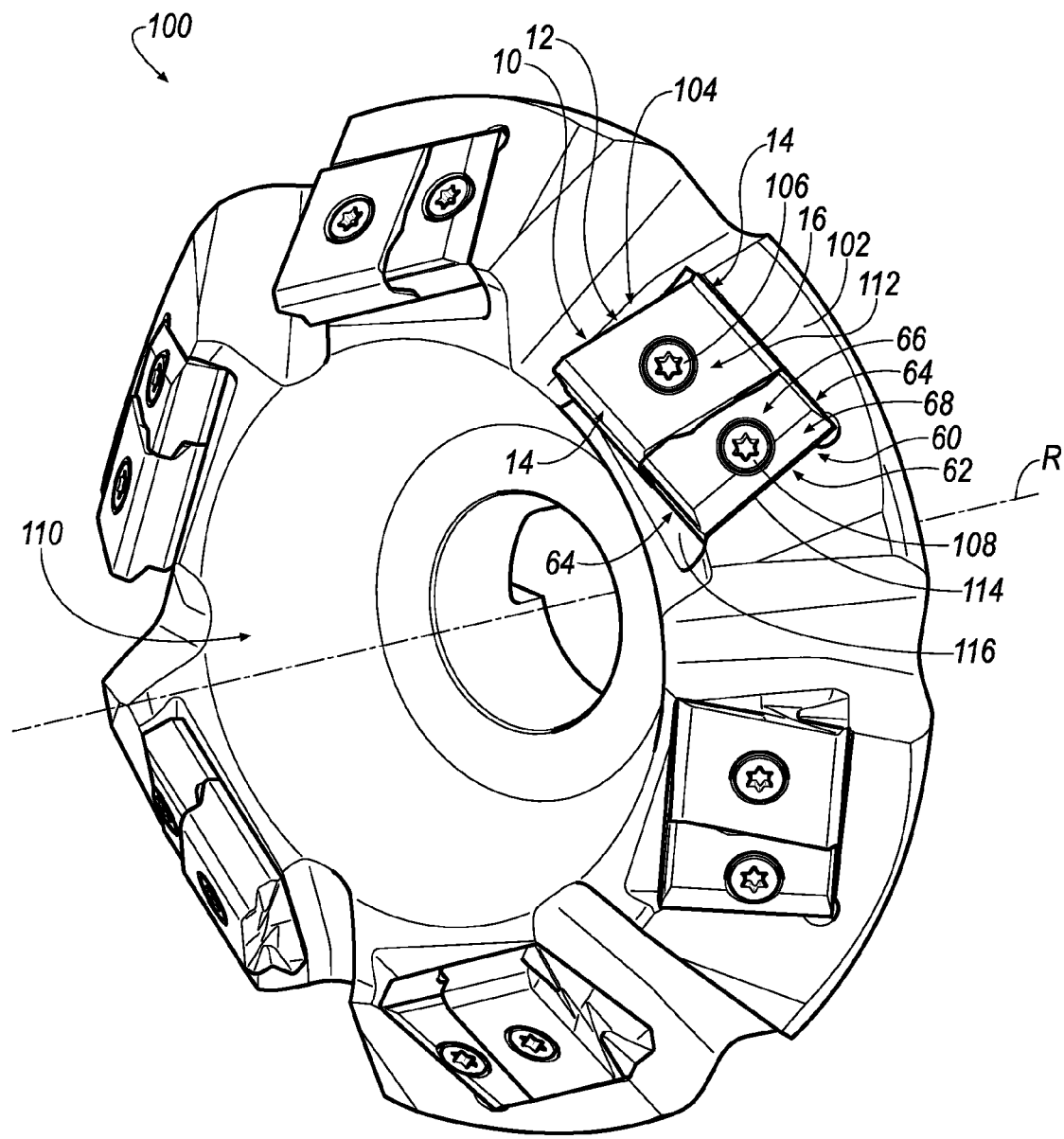
FIG. 13 is an isometric view of an exemplary embodiment of a milling cutter with the combination cutting insert and shim seating in insert pockets.
Figure 14:
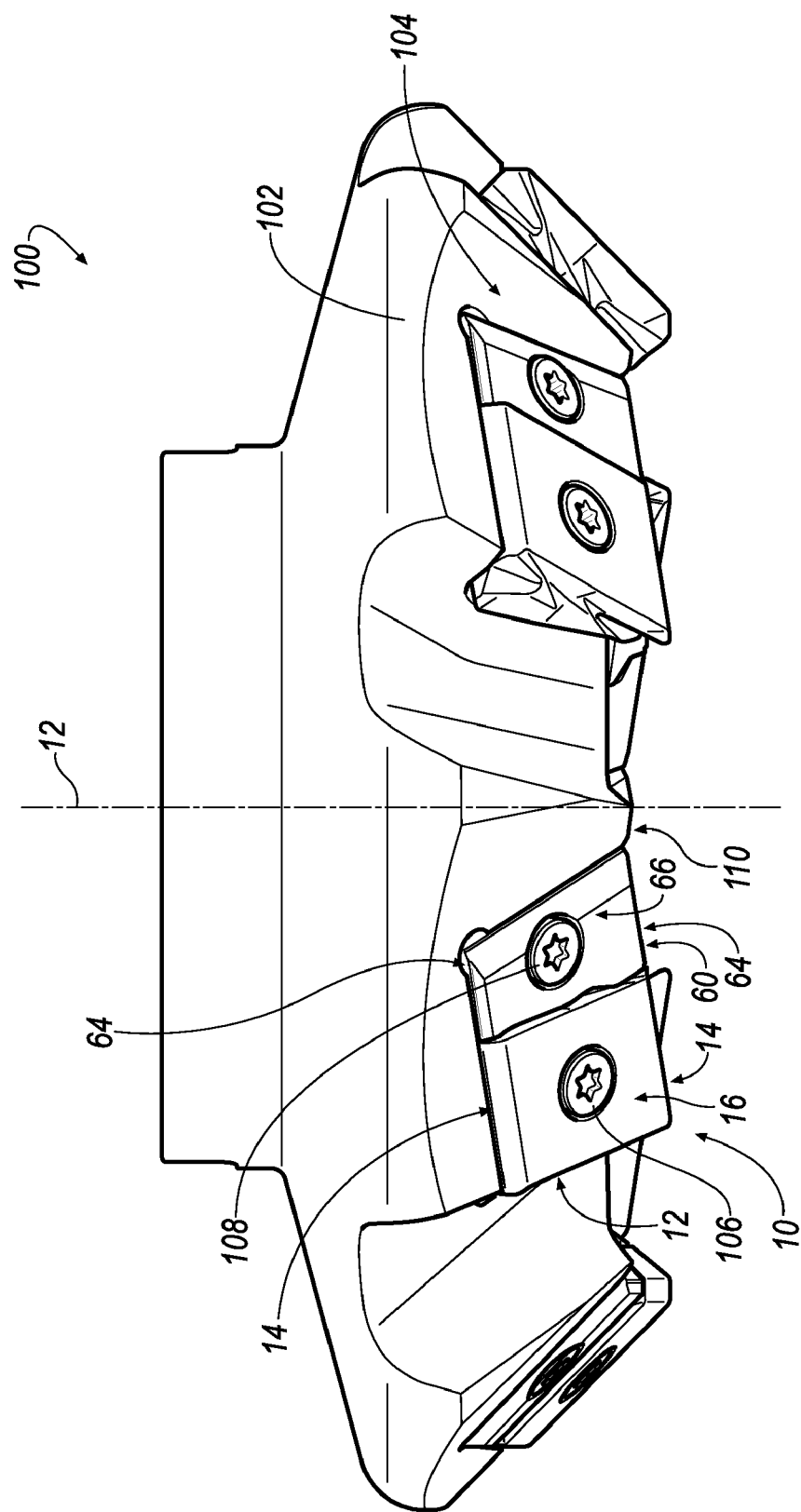
FIG. 14 is a side view of the exemplary embodiment of the milling cutter of FIG. 13.

Referring now to FIGS. 13 and 14, a milling cutter 100 is shown according to an embodiment of the invention. The milling cutter 100 has an axis of rotation R, and a cutter body 102 with a plurality of insert pockets 104. In each insert pocket 104, the cutting insert 10 and shim 60 of the invention is tangentially mounted to the cutter body 102 by means of a clamping screw 106, 108, respectively. As can be seen, each cutting insert 10 is seated so that there is a clearance between a workpiece (not shown) and the minor side surface 14 of the cutting insert 10, the minor side surface 64 of the shim 60 and the face 110 of the milling cutter 100.

The insert pocket 104 includes a side wall 112 and a rear wall 114 generally transverse to a bottom wall 116. Each wall 112, 114, 116 is generally planar. When seated in the insert pocket 104, one of the minor side surfaces 14 of the cutting insert 10 is adjacent and engages the side wall 112, and one of the major side surfaces 16 of the cutting inset 10 is adjacent and engages the bottom wall 116 of the insert pocket 104. Similarly, one of the minor side surface 64 of the shim 60 is adjacent and engages the side wall 112, and one of the major side surfaces 66 of the shim 60 is adjacent and engages the bottom wall 116 of the insert pocket 104. In addition, the diagonally opposite shim abutment surfaces 26 on the end surface 12 of the cutting insert 10 engages the diagonally opposite insert abutment surfaces 76 of the shim 60 to permit proper seating and reduced rotation of the cutting insert 10 during heavy machining operations.

The patents and publications referred to herein are hereby incorporated by reference.

Having described presently preferred embodiments the invention may be otherwise embodied within the scope of the appended claims.

What is claimed is:

1. In combination, a cutting insert and shim for heavy machining operations,
the cutting insert comprising:
two opposing end surfaces, two opposing minor side surfaces extending between the two opposing end surfaces, two opposing major side surfaces extending between the end surfaces and the minor side surfaces, each end surface having four corners comprising two lowered corners and two raised corners, each end surface provided with two raised members and two lowered abutment members, each lowered abutment member having a shim abutment surface, wherein the shim abutment surfaces are diagonally opposite each other with respect to a central axis A2 passing through the two minor side surfaces of the cutting insert,
the shim comprising:
two opposing end surfaces, two opposing minor side surfaces extending between the two opposing end surfaces, two opposing major side surfaces extending between the end surfaces and the minor side surfaces, one end surface having four corners comprising two lowered corners and two raised corners, the one end surface being provided with two raised abutment members and two lowered members, each raised abutment member having an insert abutment surface, wherein the insert abutment surfaces are diagonally opposite each other with respect to a central axis A2 passing through the two minor side surfaces of the shim,
wherein the shim abutment surfaces of the cutting insert engage the insert abutment surfaces of the shim when the cutting insert and shim are mounted within an insert pocket of a cutting tool.

2. The combination of claim 1, wherein each end surface of the cutting insert has 180° rotational symmetry about a central axis A1 passing through the two end surfaces of the cutting insert, each minor side surface has 180° rotational symmetry about the central axis A2 passing through the two minor side surfaces of the cutting insert, and each major side surface has 180° rotational symmetry about a central axis A3 passing through the two major side surfaces of the cutting insert, and wherein the central axis A2 is perpendicular to the central axis A1, and the central axis A3 is perpendicular to the central axis A1 and to the central axis A2.

3. The combination of claim 2, wherein the shim abutment surfaces are substantially coplanar with each other and substantially parallel with both the central axis A2 and the central axis A3 of the cutting insert.

4. The combination of claim 1, wherein one end surface of the shim has 180° rotational symmetry about a central axis A1 passing through the two end surfaces of the shim, each minor side surface is asymmetric about the central axis A2 passing though the two minor side surfaces of the shim, and each major side surface has 180° rotational symmetry about a central axis A3 passing through the two major side surfaces of the shim, and wherein the central axis A2 is perpendicular to the central axis A1, and the central axis A3 is perpendicular to the central axis A1 and to the central axis A2.

5. The combination of claim 4, wherein the insert abutment surfaces are substantially coplanar with each other and substantially parallel with both the central axis A2 and the central axis A3 of the shim.

6. The combination of claim 1, wherein the cutting insert further includes four opposed corner side surfaces between the minor and major side surfaces and the end surfaces.

7. The combination of claim 6, wherein the cutting insert further includes two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces.

8. The combination of claim 7, wherein the cutting insert further includes a major cutting edge formed at an intersection of each major edge and the end surface and extends along substantially an entire length of its associated major edge, and a minor cutting edge formed at an intersection of each minor edge and the end surface and extends along at least half of the length of its associated minor edge, and a corner cutting edge formed at an intersection of the major and minor cutting edges.

9. The combination of claim 8, wherein a section of the major cutting edge proximate the raised corner constitutes a leading end of the major cutting edge, and wherein a section of the major cutting edge proximate the lowered corner constitutes a trailing end of the major cutting edge.

10. A milling cutter, comprising:
a plurality of insert pockets; and
a combination of a cutting insert and a shim in accordance with claim 1 seated in each of the plurality of insert pockets.

* * * * *